US011807442B2

(12) United States Patent
Jansen et al.

(10) Patent No.: US 11,807,442 B2
(45) Date of Patent: Nov. 7, 2023

(54) PITH FILLED HONEYCOMB INSULATING PANELS AND PACKAGES

(71) Applicant: Smartech International LP, Charlotte, NC (US)

(72) Inventors: Martinus G. M. L. Jansen, Cornelius, NC (US); Jannica Z. J. Greife, Charlotte, NC (US)

(73) Assignee: Smartech International LP, Charlotte, NC (US)

(\*) Notice: Subject to any disclaimer, the term of this patent is extended or adjusted under 35 U.S.C. 154(b) by 459 days.

(21) Appl. No.: 17/113,636

(22) Filed: Dec. 7, 2020

(65) Prior Publication Data
US 2022/0177215 A1    Jun. 9, 2022

(51) Int. Cl.
*B65D 81/38*     (2006.01)
*B65D 65/46*     (2006.01)
(Continued)

(52) U.S. Cl.
CPC ............ *B65D 81/3823* (2013.01); *B32B 3/12* (2013.01); *B32B 29/002* (2013.01);
(Continued)

(58) Field of Classification Search
USPC .............. 428/34.2, 35.6, 116, 117, 118
See application file for complete search history.

(56) References Cited

U.S. PATENT DOCUMENTS 5,820,268 A  \*  10/1998  Becker ............... B65D 81/3862
                                                                220/592.2
6,635,202 B1     10/2003  Bugg et al.
(Continued)

FOREIGN PATENT DOCUMENTS

CN     110450502 A  \*  11/2019  ............. B32B 29/06
DE     4223376 A1  \*  1/1994  ........... B65D 65/466
(Continued)

OTHER PUBLICATIONS

The Yearbook of the United States Department of Agriculture (Year: 1910).\*
(Continued)

*Primary Examiner* — Lee E Sanderson
(74) *Attorney, Agent, or Firm* — Sterne, Kessler, Goldstein & Fox P.L.L.C.

(57) ABSTRACT

A biodegradable insulating panel for a package includes a first layer of biodegradable material, a second layer of biodegradable material opposite the first layer, a moisture repellant layer, a biodegradable honeycomb core, and granulated pith. The moisture repellant layer is disposed on exterior surfaces of the first and second layers. The biodegradable honeycomb core is disposed between the first and second layers. The granulated pith is disposed within the honeycomb core to increase the resistance to heat flow of the panel. The biodegradable insulating panel has a density no greater than about 300 kg/m³. A biodegradable insulating package includes a plurality of insulating panels. The biodegradable insulating package is thermally insulating such that a temperature of an item disposed in the package increases no greater than 0.24° C./min (e.g., during ASTM D3103 test).

20 Claims, 7 Drawing Sheets

(51) Int. Cl.
*B32B 3/12* (2006.01)
*B32B 29/00* (2006.01)

(52) U.S. Cl.
CPC ........ *B65D 65/466* (2013.01); *B32B 2255/02* (2013.01); *B32B 2255/12* (2013.01); *B32B 2264/062* (2013.01); *B32B 2307/304* (2013.01); *B32B 2307/7163* (2013.01); *B32B 2307/72* (2013.01); *B32B 2307/73* (2013.01); *B32B 2553/00* (2013.01)

(56) References Cited

U.S. PATENT DOCUMENTS

| | | | |
|---|---|---|---|
| 8,763,886 B2 | 7/2014 | Hall | |
| 8,841,115 B2 | 9/2014 | Ploechinger | |
| 10,279,514 B2 | 5/2019 | Meyer et al. | |
| 10,400,105 B2 | 9/2019 | Stevens | |
| 2005/0042416 A1* | 2/2005 | Blackmon | B32B 27/36 428/116 |
| 2011/0259895 A1* | 10/2011 | Parenteau | B32B 7/12 220/592.2 |
| 2012/0031957 A1 | 2/2012 | Whitaker | |
| 2018/0134015 A1 | 5/2018 | Teruel | |
| 2019/0249369 A1 | 8/2019 | Segal | |

FOREIGN PATENT DOCUMENTS

| | | | | |
|---|---|---|---|---|
| DE | 4223376 A1 | 1/1994 | | |
| WO | WO-2007140008 A2 * | 12/2007 | ............. | B32B 27/10 |

OTHER PUBLICATIONS

Adlan et al., Microbial Biodegradation of Paraffin Wax in Malaysian Crude Oil Mediated by Degradative Enzymes, Frontiers in Microbiology, vol. 11. (Year: 2020).*

International Search Report and Written Opinion of the International Searching Authority for International Application No. PCT/US2021/061811, USPTO, Alexandria, VA, dated Feb. 17, 2022, 9 pages.

Mayer et al., "Corn pith as insulating biomaterial: from biomass fractionation to composite production," International Conference on Biobased Materials and Composites (ICBMC 2017), Mar. 2017, 2 pages, https://hal.archives-ouvertes.fr/hal-01603803.

McIntosh et al., "Bio-SIPs: a deeper shade of Green?," SB07 Conference, Paper No. 067, Victoria University of Wellington, pp. 1-12, http://citeseerx.ist.psu.edu/viewdoc/download?doi=10.1.1.620.6502&rep=rep1&type=pdf.

Carbon-Core Corporation, "Foam-Filled Structural Honeycombs," pp. 1-2, https://www.carbon-core.com/products/structural-honeycombs/foam-filled/.

Suzhou Haxcore Material Technology Co., Ltd., "Cheap Customized Honeycomb Composite Foam Core," pp. 1-5, https://www.haxcore.com/honeycomb-core/foam-filled-honeycomb/honeycomb-composite-foam-core.html.

Dopag, "Honeycomb potting & core filling: Flawless filling of aircraft interior panels," pp. 1-3, https://www.dopag.com/applications/composite-processing/honeycomb-potting-core-filling/.

* cited by examiner

PITH FILLED HONEYCOMB INSULATING PANELS AND PACKAGES

BACKGROUND

Field

The present disclosure relates to insulating panels and packages. More specifically, embodiments of the present disclosure relate to biodegradable insulating panels and packages.

Background

E-commerce and distribution supply chains rely on packaging engineering to protect products for distribution, storage, sale, and use. Packaging engineering utilizes a variety of flexible and rigid materials, and considers structural analysis, thermal analysis, and package testing to develop a package for a particular application. Packaging can involve extrusion, thermoforming, molding, or other processing technologies.

Current packaging methods utilize non-biodegradable polymer packaging, foams, and/or foils (e.g., polystyrene, expanded polystyrene, extruded polystyrene, Styrofoam®, plastics, thermoplastics, etc.). These non-biodegradable polymers can be bulky, intractable, and moisture-absorbing (e.g., water). Recycling is the process of converting waste materials into new materials and objects. Biodegradable waste is a form of recycling. For example, a cardboard box biodegrades within about 2 months, while polystyrene foam and plastic packaging can take up to 500 years or longer to biodegrade. Biodegradable technology has recently been applied to packaging engineering.

Accordingly, there is a need for completely biodegradable insulating panels and packages that are thin, lightweight, tractable, inexpensive, cost-effective, moisture-resistant, and highly thermally insulating.

Pith is a biodegradable byproduct derived from the stems of vascular plants (e.g., corn stalks) that can be granulated. Pith is composed of parenchyma and vascular bundles scattered among the parenchyma. Leaves and pith account for more than half of the plant stalk (e.g., corn stalk). Pith has a soft and fluffy texture, low density, low mechanical strength, and high thermal resistance.

BRIEF SUMMARY

In some embodiments of the present invention, a biodegradable insulating panel for a package includes a first layer of biodegradable material, a second layer of biodegradable material opposite the first layer, a moisture repellant layer disposed on exterior surfaces of the first and second layers, a biodegradable honeycomb core disposed between the first and second layers, and granulated pith disposed within the honeycomb core to increase the resistance to heat flow of the panel.

In some embodiments, the granulated pith is loosely held within the honeycomb core. In some embodiments, the moisture repellant layer comprises a biodegradable wax.

In some embodiments, the core includes a first honeycomb core layer having a first plurality of cells and a second honeycomb core layer having a second plurality of cells. In some embodiments, the first and second honeycomb core layers are displaced relative to each other. In some embodiments, the panel further includes a first air gap disposed within each of the first plurality of cells and a second air gap disposed within each of the second plurality of cells. In some embodiments, a filled portion of each of the second plurality of cells is disposed over the first air gap of the first plurality of cells in a first configuration.

In some embodiments, an insulating panel for a package includes a first biodegradable sheet, a second biodegradable sheet, a biodegradable honeycomb core having a plurality of cells, disposed between the first and second sheets, and granulated pith disposed within the cells. In some embodiments, the panel has a density no greater than about 300 kg/m$^3$. In some embodiments, the density is no greater than about 150 kg/m$^3$.

In some embodiments, the granulated pith is loosely held within the cells. In some embodiments, the granulated pith has an average particle size no greater than about 2 mm.

In some embodiments, the panel further includes an air gap disposed within each of the cells. In some embodiments, the granulated pith occupies at least 50% but no greater than 80% of a volume of each cell.

In some embodiments, a biodegradable insulating package includes a plurality of insulating panels. In some embodiments, each insulating panel includes a first layer, a second layer, a plurality of honeycomb cells disposed between the first and second layers, and granulated pith disposed in the plurality of honeycomb cells. In some embodiments, the package is thermally insulating such that a temperature of an item disposed in the package increases no greater than 0.24° C./min.

In some embodiments, the plurality of insulating panels form a cuboid coupled to an interior of the package in a closed configuration.

In some embodiments, each of the insulating panels further includes a moisture repellant layer disposed on exterior surfaces of the first and second layers. In some embodiments, the moisture repellant layer comprises a biodegradable wax.

In some embodiments, the entire package is biodegradable. In some embodiments, the granulated pith is loosely held within the plurality of honeycomb cells. In some embodiments, each panel has a density no greater than about 300 kg/m$^3$. In some embodiments, the package has a thermal insulance RSI-value of at least 3.0° C.·m$^2$/W.

Implementations of any of the techniques described above may include a system, a method, a process, a device, and/or an apparatus. The details of one or more implementations are set forth in the accompanying drawings and the description below. Other features will be apparent from the description and drawings, and from the claims.

Further features and exemplary aspects of the embodiments, as well as the structure and operation of various embodiments, are described in detail below with reference to the accompanying drawings. It is noted that the embodiments are not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS

The accompanying drawings, which are incorporated herein and form a part of the specification, illustrate the embodiments and, together with the description, further serve to explain the principles and to enable a person skilled in the relevant art(s) to make and use the embodiments. Objects and advantages of illustrative, non-limiting embodiments will become more apparent by describing them in detail with reference to the attached drawings.

The features and exemplary aspects of the embodiments will become more apparent from the detailed description set forth below when taken in conjunction with the drawings, in which like reference characters identify corresponding elements throughout. In the drawings, like reference numbers generally indicate identical, functionally similar, and/or structurally similar elements. Additionally, generally, the left-most digit(s) of a reference number identifies the drawing in which the reference number first appears. Unless otherwise indicated, the drawings provided throughout the disclosure should not be interpreted as to-scale drawings.

DETAILED DESCRIPTION

This specification discloses one or more embodiments that incorporate the features of this present invention. The disclosed embodiment(s) merely exemplify the present invention. The scope of the invention is not limited to the disclosed embodiment(s). The present invention is defined by the claims appended hereto.

Embodiments of the present disclosure are described in detail with reference to embodiments thereof as illustrated in the accompanying drawings. References to "one embodiment," "an embodiment," "some embodiments," etc., indicate that the embodiment(s) described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Spatially relative terms, such as "beneath," "below," "lower," "above," "on," "upper" and the like, may be used herein for ease of description to describe one element or feature's relationship to another element(s) or feature(s) as illustrated in the figures. The spatially relative terms are intended to encompass different orientations of the device in use or in operation in addition to the orientation depicted in the figures. The apparatus may be otherwise oriented (e.g., rotated 90 degrees or at other orientations) and the spatially relative descriptors used herein may likewise be interpreted accordingly.

The term "about" or "substantially" or "approximately" as used herein indicates the value of a given quantity that can vary based on a particular technology. Based on the particular technology, the term "about" or "substantially" or "approximately" can indicate a value of a given quantity that varies within, for example, 1-15% of the value (e.g., ±1%, ±2%, ±5%, ±10%, or ±15% of the value).

The following examples are illustrative, but not limiting, of the present embodiments. Other suitable modifications and adaptations of the variety of conditions and parameters normally encountered in the field, and which would be apparent to those skilled in the art, are within the spirit and scope of the disclosure.

Exemplary Biodegradable Insulating Panel—Single Layer Core

As discussed above, e-commerce and distribution supply chains rely on packaging engineering to protect products for distribution, storage, sale, and use. For example, meal kit delivery services are a modern alternative to grocery shopping, and online direct-to-door meal kit service market revenue has steadily increased since 2012. On average, a meal kit delivery company ships more than 250 million meals per year, which requires 250 million shipping boxes per year. Thus, the total market exceeds 1 billion shipping boxes annually.

Pith is a biodegradable byproduct derived from the stems of vascular plants (e.g., corn stalks) that can be granulated. Pith is composed of parenchyma and vascular bundles scattered among the parenchyma. Leaves and pith account for more than half of the plant stalk (e.g., corn stalk). Pith has a soft and fluffy texture, low density, low mechanical strength, and high thermal resistance. Pith is a thermal insulator that can be used as insulation in a biodegradable shipping box.

Embodiments of biodegradable insulating panel apparatuses, systems, and methods as discussed below can provide completely (e.g., 100%) biodegradable insulating panels that are thin, lightweight, tractable, inexpensive, cost-effective, moisture-resistant, and highly thermally insulating, and provide an alternative to current non-biodegradable polymer packaging.

Figure 1:
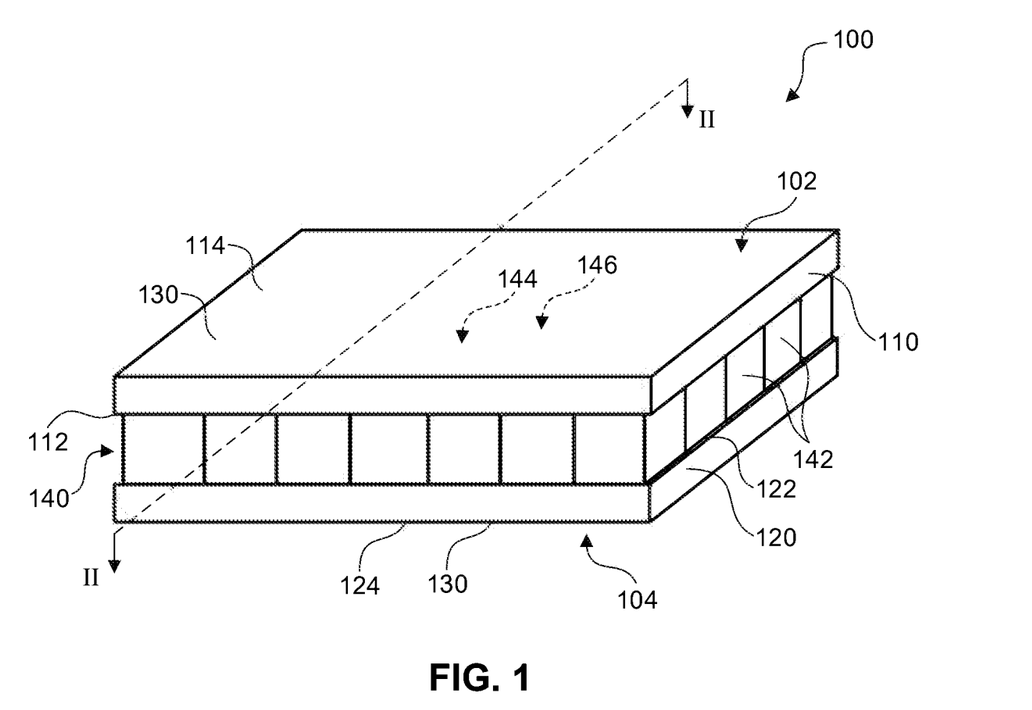
FIG. 1 illustrates a perspective view of an insulating panel, according to an embodiment.
Figure 2:
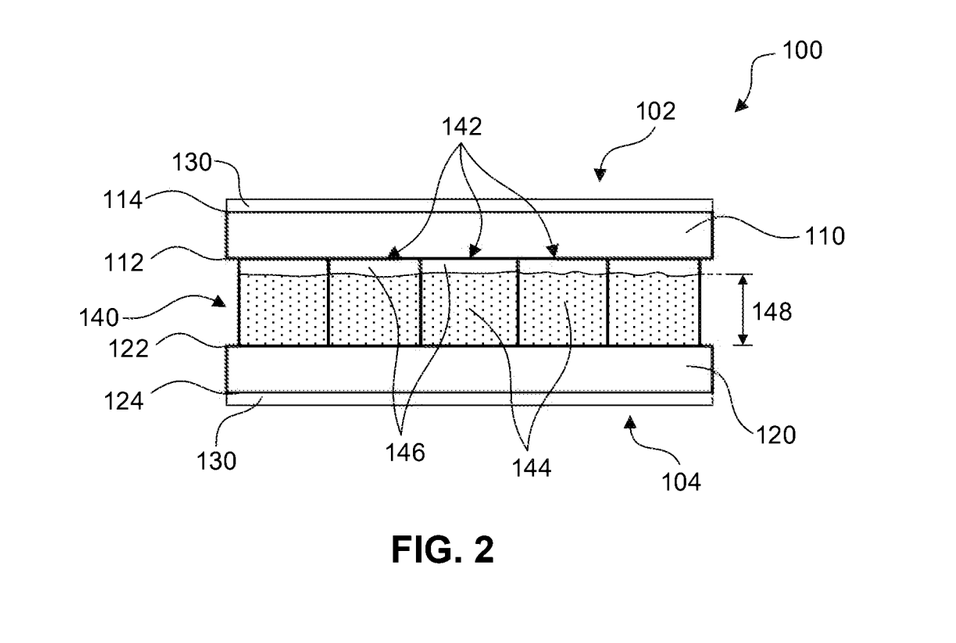
FIG. 2 illustrates a cross-sectional view of the insulating panel of FIG. 1.
Figure 3:
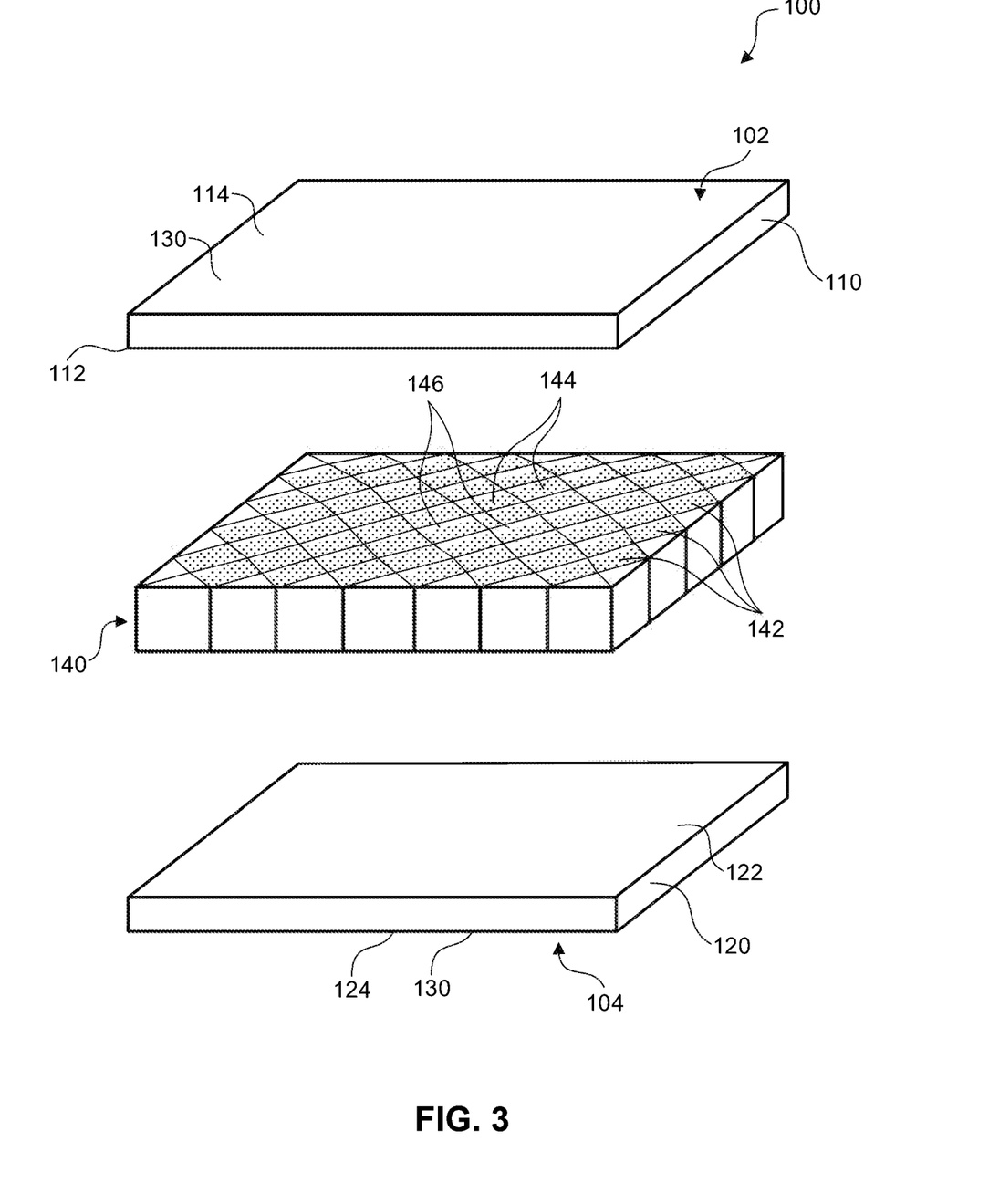
FIG. 3 illustrates a perspective exploded view of the insulating panel of FIGS. 1 and 2.

FIGS. 1-3 illustrate insulating panel shown generally at 100, according to various exemplary embodiments. FIG. 1 is a schematic perspective view of insulating panel 100, according to an exemplary embodiment. FIG. 2 is a schematic cross-sectional view of insulating panel 100 shown in FIG. 1 (along the plane indicated by II-II in FIG. 1). FIG. 3 is a schematic perspective exploded view of insulating panel 100 shown in FIGS. 1 and 2. Insulating panel 100 can be configured to be completely biodegradable. Insulating panel 100 can be further configured to provide thermal insulation to an item in a package (e.g., insulating package shown generally at 300 in FIGS. 8-10). Although insulating panel 100 is shown in FIGS. 1-3 as a stand-alone apparatus and/or system, the embodiments of this disclosure can be used with other apparatuses and/or systems, such as, but not limited to insulating package 300, multiple stacks of insulating panels 100, and/or other packaging engineering.

Figure 4:
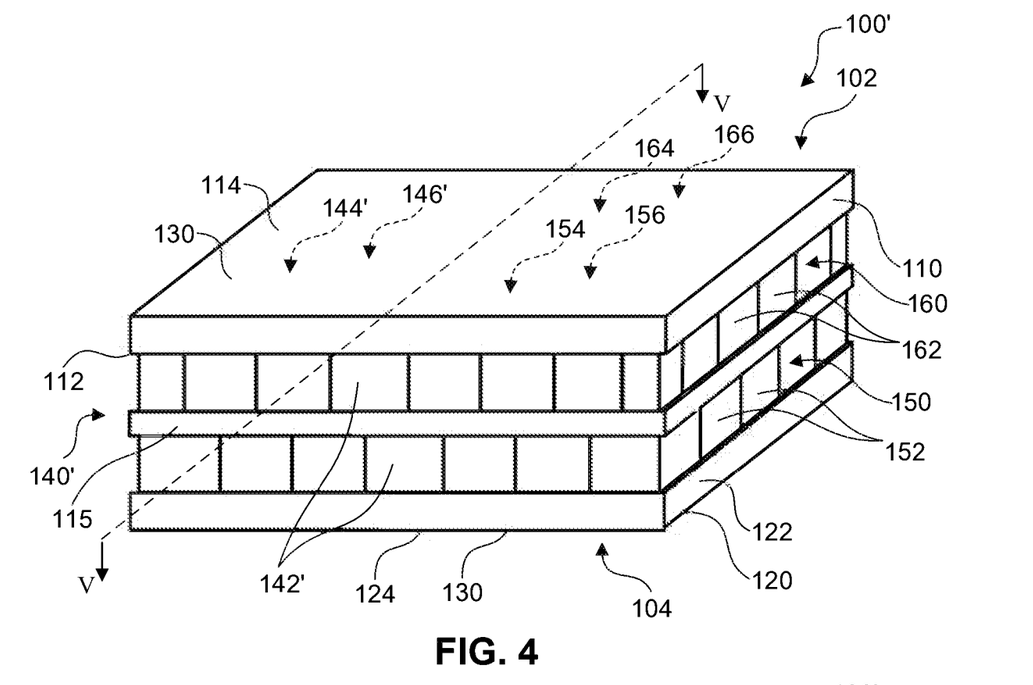
FIG. 4 illustrates a perspective view of an insulating panel, according to an embodiment.

As shown in FIGS. 1-3, insulating panel 100 can include frontside 102, backside 104, first layer 110, second layer 120, moisture repellant layer 130, honeycomb core 140, and/or granulated pith 144. In some embodiments, insulating panel 100 can be biodegradable. For example, insulating panel 100 can be completely (e.g., 100%) biodegradable. In some embodiments, insulating panel 100 can have a density no greater than about 300 kg/m³. For example, insulating panel 100 can have a density of about 180 kg/m³. In some embodiments, insulating panel 100 can have a density no greater than about 150 kg/m³. For example, insulating panel 100 can have a density of about 105 kg/m³. In some embodiments, insulating panel 100 can have a thickness between about 1 mm to about 50 cm. For example, insulating panel 100 can have a thickness of about 10 cm. In some embodiments, insulating panel 100 can have a thickness of no greater than about 2 cm. For example, insulating panel 100 can have a thickness of 1.27 cm (0.5 inches). In some embodiments, a plurality of insulating panels 100 can be stacked to form a larger (thicker) insulating panel with an increased thermal resistance. For example, as shown in FIG. 4, two insulating panels 100 can be stacked vertically to form a combined insulating panel 100'.

First layer 110 can be configured to seal honeycomb core 140 (e.g., upper portion) and provide an exterior barrier for insulating panel 100. First layer 110 can include interior surface 112 and exterior surface 114. In some embodiments, first layer 110 can be a biodegradable material. For example, first layer 110 can be a paper-based packaging (e.g., cardboard, paperboard, containerboard, boxboard, paper bag, newsprint, wax paper, parchment paper, packing paper, etc.). In some embodiments, for example, first layer 110 can be packing paper (e.g., Virgin Kraft packing paper 31 #). In some embodiments, first layer 110 can include a moisture-resistant layer. For example, exterior surface 114 of first layer 110 can be coated with moisture repellant layer 130 (e.g., a biodegradable wax). In some embodiments, first layer 110 can be part of honeycomb core 140. For example, first layer 110 can be a bottom layer (e.g., support layer) of a paper-based honeycomb packaging (e.g., cardboard, Hexacomb®, etc.).

As shown in FIGS. 1-3, second layer 120 can be disposed opposite first layer 110. Second layer 120 can be configured to seal honeycomb core 140 (e.g., lower portion) and provide an exterior barrier for insulating panel 100. Second layer 120 can include interior surface 122 and exterior surface 124. In some embodiments, second layer 120 can be a biodegradable material. For example, second layer 120 can be a paper-based packaging (e.g., cardboard, paperboard, containerboard, boxboard, paper bag, newsprint, wax paper, parchment paper, packing paper, etc.). In some embodiments, for example, second layer 120 can be packing paper (e.g., Virgin Kraft packing paper 31 #). In some embodiments, second layer 120 can include a moisture-resistant layer. For example, exterior surface 124 of second layer 120 can be coated with moisture repellant layer 130 (e.g., a biodegradable wax). In some embodiments, second layer 120 can be part of honeycomb core 140. For example, second layer 120 can be a bottom layer of a paper-based honeycomb packaging (e.g., cardboard, Hexacomb®, etc.).

As shown in FIGS. 1-3, honeycomb core 140 can be disposed between first and second layers 110, 120. Honeycomb core 140 can be configured to retain granulated pith 144 in order to increase the resistance to heat flow of insulating panel 100. Honeycomb core 140 can include cells 142 configured to retain granulated pith 144. In some embodiments, honeycomb core 140 can be a biodegradable material. For example, honeycomb core 140 can be a paper-based honeycomb packaging (e.g., cardboard, Hexacomb®, paperboard, containerboard, boxboard, Virgin Kraft core paper 33 #, etc.).

Figure 5:
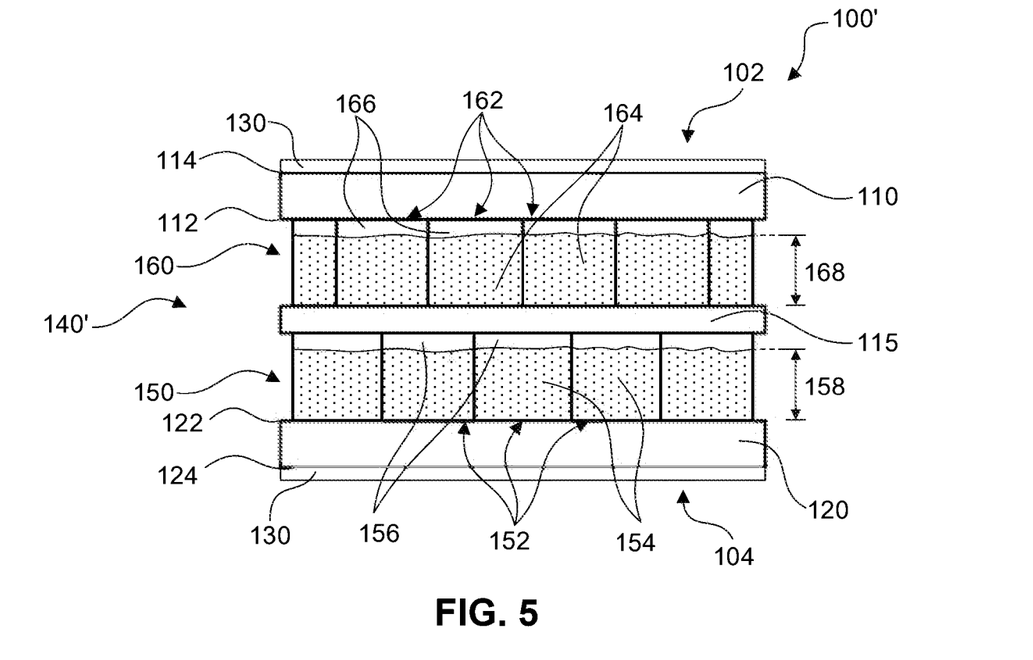
FIG. 5 illustrates a cross-sectional view of the insulating panel of FIG. 4.
Figure 6:
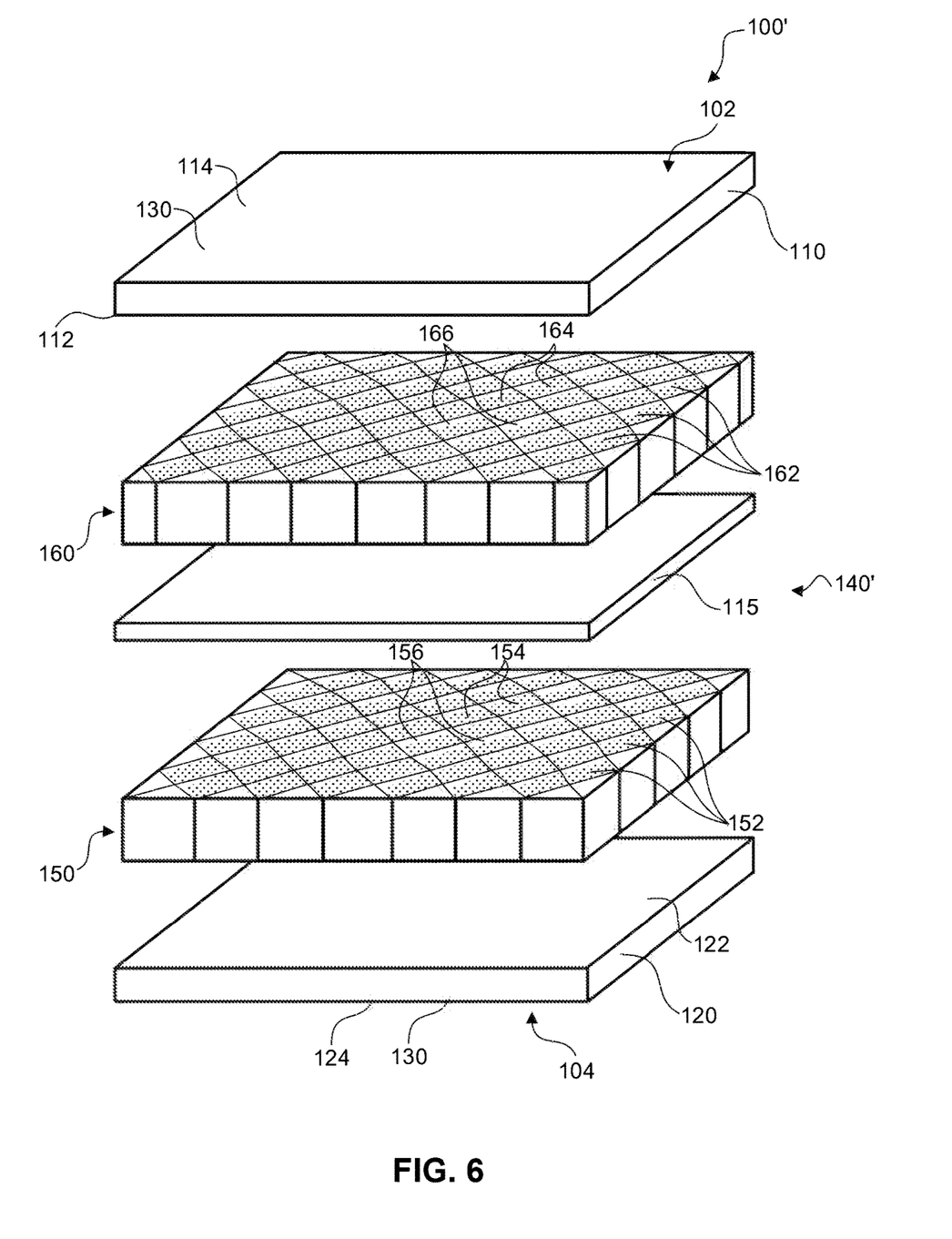
FIG. 6 illustrates a perspective exploded view of the insulating panel of FIGS. 4 and 5.
Figure 7:
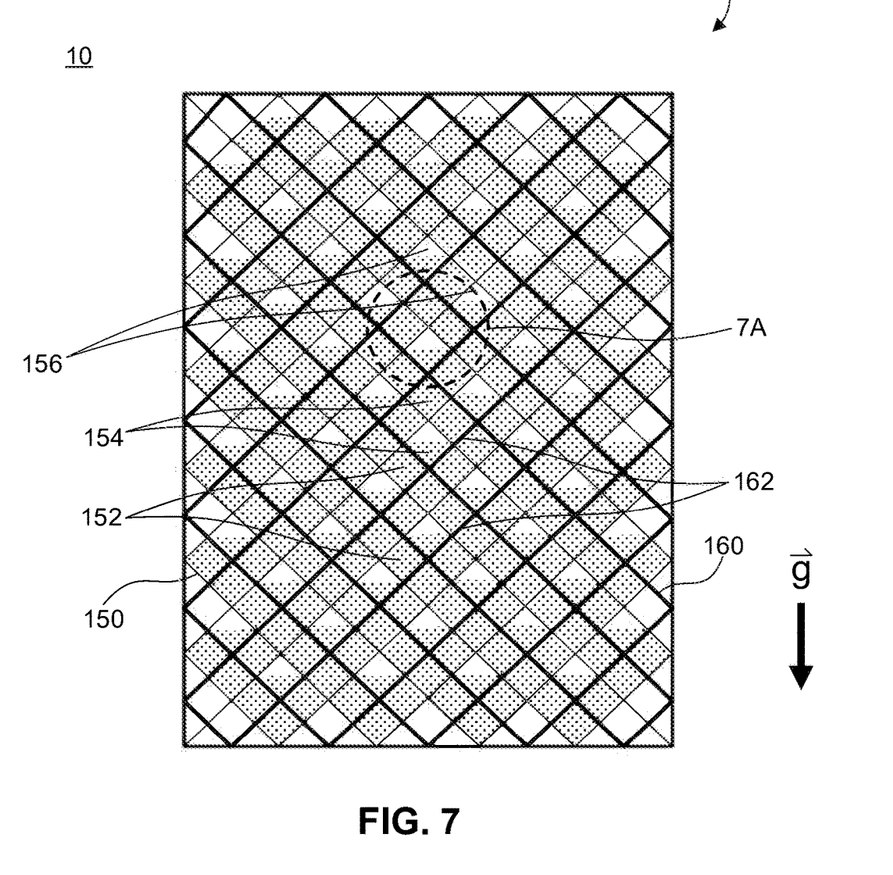
FIG. 7 illustrates a plan view of a honeycomb core of the insulating panel of FIGS. 4-6.
Figure 7A:
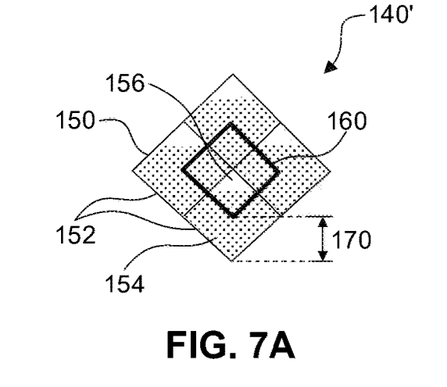
FIG. 7A illustrates an enlarged plan view of the honeycomb core of FIG. 7.
Figure 7B:
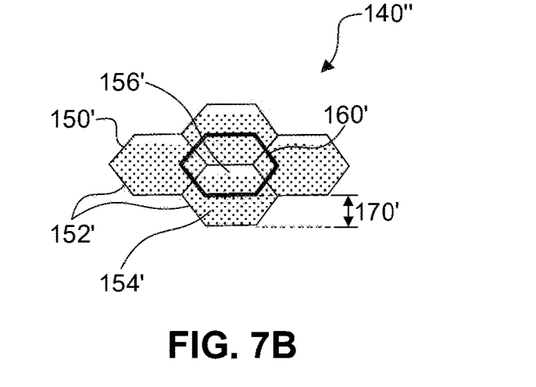
FIG. 7B illustrates an enlarged plan view of a honeycomb core, according to an embodiment.

In some embodiments, honeycomb core 140 can include one layer. For example, as shown in FIGS. 2 and 3, honeycomb core 140 can be a single layer core. In some embodiments, honeycomb core 140 can include two or more layers. For example, as shown in FIGS. 4-6, honeycomb core 140 can be a double layer core with first and second honeycomb core layers 150, 160. In some embodiments, honeycomb core 140 can include two or more core layers divided by intermediate layer 115. For example, as shown in FIGS. 4-6, honeycomb core 140 can be a double layer core with first and second honeycomb core layers 150, 160 separated by intermediate layer 115. In some embodiments, cells 142 of honeycomb core 140 can be polygons arranged symmetrically and/or periodically. For example, as shown in FIGS. 7 and 7A, cells 142 can be quadrilateral. For example, as shown in FIG. 7B, cells 142 can be hexagonal. In some embodiments, honeycomb core 140 can include a plurality of cells 142 having any generic shape that divides honeycomb core 140 into separate volumes. For example, honeycomb core 140 can include 1, 2, 4, 8, 10, 16, 20, 32, etc. cell(s) 142.

In some embodiments, cells 142 of honeycomb core 140 can include granulated pith 144 and air gaps 146. For example, as shown in FIGS. 2 and 3, each cell 142 can include granulated pith 144 and air gap 146. Air gap 146 can be configured to prevent adhesion between granulated pith 144 and first layer 110 and/or second layer 120 when insulating panel 100 is formed. In some embodiments, granulated pith 144 can occupy less than 100% of a volume of each cell 142 in order to form air gap 146. For example, as shown in FIG. 2, granulated pith 144 can occupy filled cell volume 148. In some embodiments, filled cell volume 148 can be no greater than 90% of a volume of each cell 142. In some embodiments, filled cell volume 148 can be no greater than 80% of a volume of each cell 142.

As shown in FIGS. 2 and 3, granulated pith 144 can be disposed in cells 142 of honeycomb core 140. Granulated pith 144 can be configured to act as a thermal insulator for insulating panel 100 and increase the resistance to heat flow of insulating panel 100. In some embodiments, granulated pith 144 can be biodegradable. For example, granulated pith 144 can be completely (e.g., 100%) biodegradable. In some embodiments, granulated pith 144 can be based on pith and/or stems of vascular plants. For example, granulated pith 144 can be based on corn stalks and/or maize stalks.

In some embodiments, granulated pith 144 can be loosely held within cells 142 of honeycomb core 140. In some embodiments, granulated pith 144 can have an average particle size between about 10 microns to about 20 mm. For example, granulated pith 144 can have an average particle size of about 5 mm. In some embodiments, granulated pith 144 can have an average particle size no greater than about 2 mm. For example, granulated pith 144 can have an average particle size no greater than about 850 microns.

Exemplary Biodegradable Insulating Panel—Double Layer Core

FIGS. 4-7, 7A, and 7B illustrate insulating panel 100', according to various exemplary embodiments. FIG. 4 is a schematic perspective view of insulating panel 100', according to an exemplary embodiment. FIG. 5 is a schematic cross-sectional view of insulating panel 100' shown in FIG. 4 (along the plane indicated by V-V in FIG. 4). FIG. 6 is a schematic perspective exploded view of insulating panel 100' shown in FIGS. 4 and 5. FIG. 7 is a schematic plan view of honeycomb core 140' of insulating panel 100' shown in FIGS. 4-6. FIG. 7A is a schematic enlarged plan view of honeycomb core 140' shown in FIG. 7. FIG. 7B is a schematic enlarged plan view of honeycomb core 140", according to an explemary embodiment. Insulating panel 100' can be configured to be completely biodegradable. Insulating panel 100' can be further configured to provide thermal insulation to an item in a package (e.g., insulating package 300 shown in FIGS. 8-10).

FIGS. 4-7, 7A, and 7B illustrate insulating panel 100', according to certain embodiments. The embodiments of insulating panel 100 shown in FIGS. 1-3, for example, and the embodiments of insulating panel 100' shown in FIGS. 4-7, 7A, and 7B may be similar. Similar reference numbers are used to indicate features of the embodiments of insulating panel 100 shown in FIGS. 1-3 and the similar features of the embodiments of insulating panel 100' shown in FIGS. 4-7, 7A, and 7B. One difference between the embodiments of insulating panel 100 shown in FIGS. 1-3 and the embodiments of insulating panel 100' shown in FIGS. 4-7, 7A, and 7B is that insulating panel 100' includes honeycomb core 140' with first and second honeycomb core layers 150, 160 (e.g., double layer core) and/or intermediate layer 115, rather than just honeycomb core 140 shown in FIGS. 1-3 (e.g., single layer core). Although insulating panel 100' is shown in FIGS. 4-7, 7A, and 7B as a stand-alone apparatus and/or system, the embodiments of this disclosure can be used with other apparatuses and/or systems, such as, but not limited to, insulating panel 100, insulating package 300, and/or other packaging engineering. In some embodiments, insulating panel 100' can include two or more insulating panels 100 to form a combined insulating panel stack. For example, as shown in FIGS. 4-6, insulating panel 100' can include two insulating panels 100 stacked vertically atop one another, where intermediate layer 115 includes first layer 110 of a first insulating panel 100 (e.g., bottom panel) and intermediate layer 115 includes second layer 120 of a second insulating panel 100 (e.g., top panel).

As shown in FIGS. 4-6, insulating panel 100' can include frontside 102, backside 104, first layer 110, second layer 120, moisture repellant layer 130, honeycomb core 140', and/or granulated pith 144'. Honeycomb core 140' can include first honeycomb core layer 150, second honeycomb core layer 160, and/or intermediate layer 115. In some embodiments, insulating panel 100' can be biodegradable. For example, insulating panel 100' can be completely (e.g., 100%) biodegradable. In some embodiments, insulating panel 100' can have a density no greater than about 300 kg/m³. For example, insulating panel 100' can have a density of about 180 kg/m³. In some embodiments, insulating panel 100' can have a density no greater than about 150 kg/m³. For example, insulating panel 100' can have a density of about 105 kg/m³. In some embodiments, insulating panel 100' can have a thickness between about 2 mm to about 100 cm. For example, insulating panel 100' can have a thickness of about 20 cm. In some embodiments, insulating panel 100' can have a thickness of no greater than about 2 cm. For example, insulating panel 100' can have a thickness of 1.27 cm (0.5 inches).

First honeycomb core layer 150 can be configured to retain first granulated pith 154 in order to increase the resistance to heat flow of insulating panel 100'. First honeycomb core layer 150 can include first cells 152 configured to retain first granulated pith 154. In some embodiments, first honeycomb core layer 150 can be a biodegradable material. For example, first honeycomb core layer 150 can be a paper-based honeycomb packaging (e.g., cardboard, Hexacomb®, paperboard, containerboard, boxboard, Virgin Kraft core paper 33 #, etc.).

In some embodiments, first cells 152 of first honeycomb core layer 150 can be polygons arranged symmetrically and/or periodically. For example, as shown in FIGS. 7 and 7A, first cells 152 can be quadrilateral. For example, as shown in FIG. 7B, first cells 152 can be hexagonal. In some embodiments, first cells 152 of first honeycomb core layer 150 can include first granulated pith 154 and first air gaps 156. For example, as shown in FIGS. 5 and 6, each first cell 152 can include first granulated pith 154 and first air gap 156. First air gap 156 can be configured to prevent adhesion between first granulated pith 154 and second honeycomb core layer 160 when insulating panel 100' is formed. In some embodiments, first granulated pith 154 can occupy less than 100% of a volume of each first cell 152 in order to form first air gap 156. For example, as shown in FIG. 5, first granulated pith 154 can occupy first filled cell volume 158. In some embodiments, first filled cell volume 158 can be at least 50% but no greater than 90% of a volume of each first cell 152. In some embodiments, first filled cell volume 158 can be at least 50% but no greater than 80% of a volume of each first cell 152.

As shown in FIGS. 4 and 5, first granulated pith 154 can be disposed in first cells 152 of first honeycomb core layer 150. First granulated pith 154 can be configured to act as a thermal insulator for insulating panel 100' and increase the resistance to heat flow of insulating panel 100'. In some embodiments, first granulated pith 154 can be biodegradable. For example, first granulated pith 154 can be completely (e.g., 100%) biodegradable. In some embodiments, first granulated pith 154 can be based on pith and/or stems of vascular plants. For example, first granulated pith 154 can be based on corn stalks and/or maize stalks. In some embodiments, first granulated pith 154 can be loosely held within first cells 152 of first honeycomb core layer 150. In some embodiments, first granulated pith 154 can have an average particle size between about 10 microns to about 20 mm. For example, first granulated pith 154 can have an average particle size of about 5 mm. In some embodiments, first granulated pith 154 can have an average particle size no greater than about 2 mm. For example, first granulated pith 154 can have an average particle size no greater than about 850 microns.

As shown in FIGS. 4-6, second honeycomb core layer 160 can be disposed above first honeycomb core layer 150. Second honeycomb core layer 160 can be configured to retain second granulated pith 164 in order to increase the resistance to heat flow of insulating panel 100'. Second honeycomb core layer 160 can include second cells 162 configured to retain second granulated pith 164. In some embodiments, second honeycomb core layer 160 can be a biodegradable material. For example, second honeycomb core layer 160 can be a paper-based honeycomb packaging (e.g., cardboard, Hexacomb®, paperboard, containerboard, boxboard, Virgin Kraft core paper 33 #, etc.).

In some embodiments, second cells 162 of second honeycomb core layer 160 can be polygons arranged symmetrically and/or periodically. For example, as shown in FIGS. 7 and 7A, second cells 162 can be quadrilateral. For example, as shown in FIG. 7B, second cells 162 can be hexagonal. In some embodiments, second cells 162 of second honeycomb core layer 160 can include second granulated pith 164 and second air gaps 166. For example, as shown in FIGS. 5 and 6, each second cell 162 can include second granulated pith 164 and second air gap 166. Second air gap 166 can be configured to prevent adhesion between second granulated pith 164 and first layer 110 when insulating panel 100' is formed. In some embodiments, second granulated pith 164 can occupy less than 100% of a volume of each second cell 162 in order to form second air gap 166. For example, as shown in FIG. 5, second granulated pith 164 can occupy second filled cell volume 168. In some embodiments, second filled cell volume 168 can be at least 50% but no greater than 90% of a volume of each second cell 162. In some embodiments, second filled cell volume 168 can be at least 50% but no greater than 80% of a volume of each second cell 162.

As shown in FIGS. 4 and 5, second granulated pith 164 can be disposed in second cells 162 of second honeycomb core layer 160. Second granulated pith 164 can be configured to act as a thermal insulator for insulating panel 100' and increase the resistance to heat flow of insulating panel 100'. In some embodiments, second granulated pith 164 can be biodegradable. For example, second granulated pith 164 can be completely (e.g., 100%) biodegradable. In some embodiments, second granulated pith 164 can be based on pith and/or stems of vascular plants. For example, second granulated pith 164 can be based on corn stalks and/or maize stalks. In some embodiments, second granulated pith 164 can be loosely held within second cells 162 of second honeycomb core layer 160. In some embodiments, second granulated pith 164 can have an average particle size between about 10 microns to about 20 mm. For example, second granulated pith 164 can have an average particle size of about 5 mm. In some embodiments, second granulated pith 164 can have an average particle size no greater than about 2 mm. For example, second granulated pith 164 can have an average particle size no greater than about 850 microns.

In some embodiments, second honeycomb core layer 160 can include a paper-based packaging layer (e.g., cardboard, paperboard, containerboard, boxboard, paper bag, newsprint, wax paper, parchment paper, packing paper, etc.) configured to retain second granulated pith 164 and separate second honeycomb core layer 160 from first honeycomb core layer 150. For example, second honeycomb core layer 160 can include a bottom layer of a paper-based honeycomb packaging (e.g., cardboard, Hexacomb®, etc.).

In some embodiments, honeycomb core 140' can include intermediate layer 115. For example, as shown in FIGS. 4-6, intermediate layer 115 can be disposed between first and second honeycomb core layers 150, 160. Intermediate layer 115 can be configured to seal first honeycomb core layer 150 (e.g., upper layer) and/or second honeycomb core layer 160 (e.g., bottom layer) and provide an exterior barrier for insulating panel 100'. In some embodiments, intermediate layer 115 can be similar to first layer 110 and/or second layer 120. In some embodiments, intermediate layer 115 can be a biodegradable material. For example, intermediate layer 115 can be a paper-based packaging (e.g., cardboard, paperboard, containerboard, boxboard, paper bag, newsprint, wax paper, parchment paper, packing paper, etc.). In some embodiments, for example, intermediate layer 115 can be packing paper (e.g., Virgin Kraft packing paper 31 #). In some embodiments, intermediate layer 115 can include a moisture-resistant layer. For example, an exterior surface of intermediate layer 115 can be coated with moisture repellant layer 130 (e.g., a biodegradable wax). In some embodiments, intermediate layer 115 can be part of honeycomb core 140' (e.g., second honeycomb core layer 160). For example, intermediate layer 115 can be a bottom layer (e.g., support layer) of a paper-based honeycomb packaging (e.g., cardboard, Hexacomb®, etc.) for second honeycomb core layer 160.

In some embodiments, first and second honeycomb core layers 150, 160 can be displaced relative to one another. For example, as shown in FIG. 7A, second cells 162 of second honeycomb core layer 160 can be displaced from first cells 152 of first honeycomb core layer by relative distance 170 (e.g., ½ length of first and second cells 152, 162). In some embodiments, second filled cell volume 168 of second cells 162 can be disposed over first air gaps 156 of first cells 152 in a first configuration (e.g., vertical configuration 10) to cover first air gaps 156 and increase the resistance to heat flow of insulating panel 100'. For example, as shown in FIGS. 7 and 7A, when first and second honeycomb core layers 150, 160 are oriented upright in vertical configuration 10 (e.g., opposing gravity g), first air gaps 156 of first cells 152 are covered by second granulated pith 164 in second cells 162 due to relative distance 170 between first cells 152 and second cells 162 (e.g., ½ length of first and second cells 152, 162). In some embodiments, insulating panel 100' can include honeycomb core 140" that includes hexagonal first and second cells 152', 162'. For example, as shown in FIG. 7B, hexagonal first and second honeycomb core layers 150', 160' can be displaced relative to each other by relative distance 170' (e.g., ½ length of first and second cells 152', 162').

Exemplary Biodegradable Insulating Package

Figure 8:
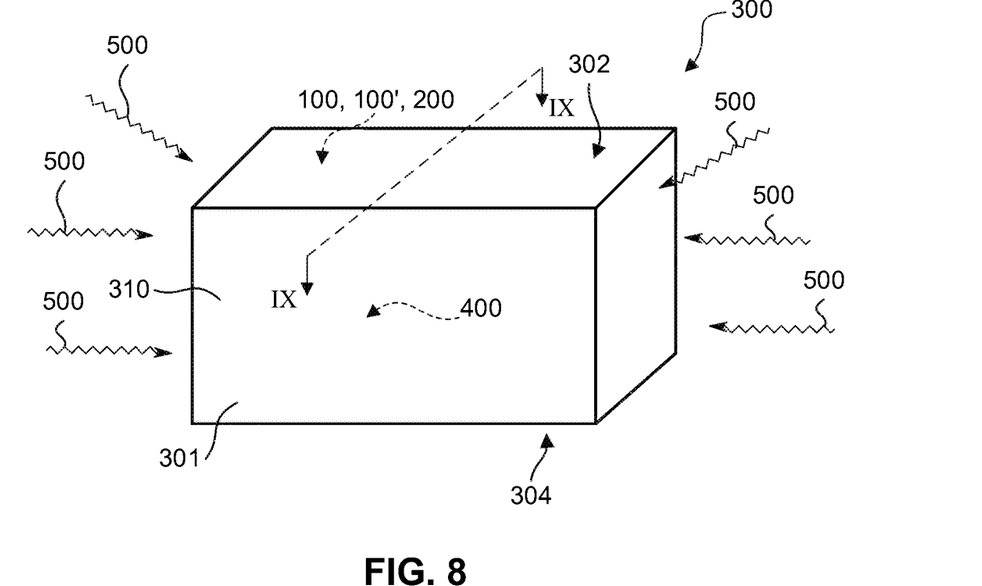
FIG. 8 illustrates a perspective view of an insulating package, according to an embodiment.
Figure 9:
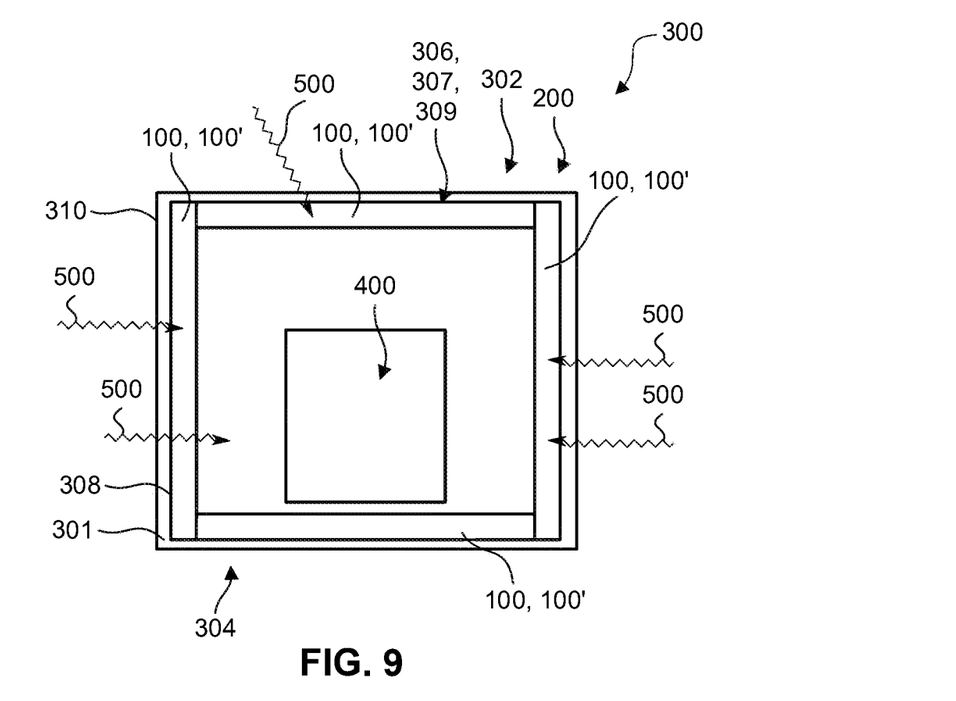
FIG. 9 illustrates a cross-sectional view of the insulating package of FIG. 8.
Figure 10:
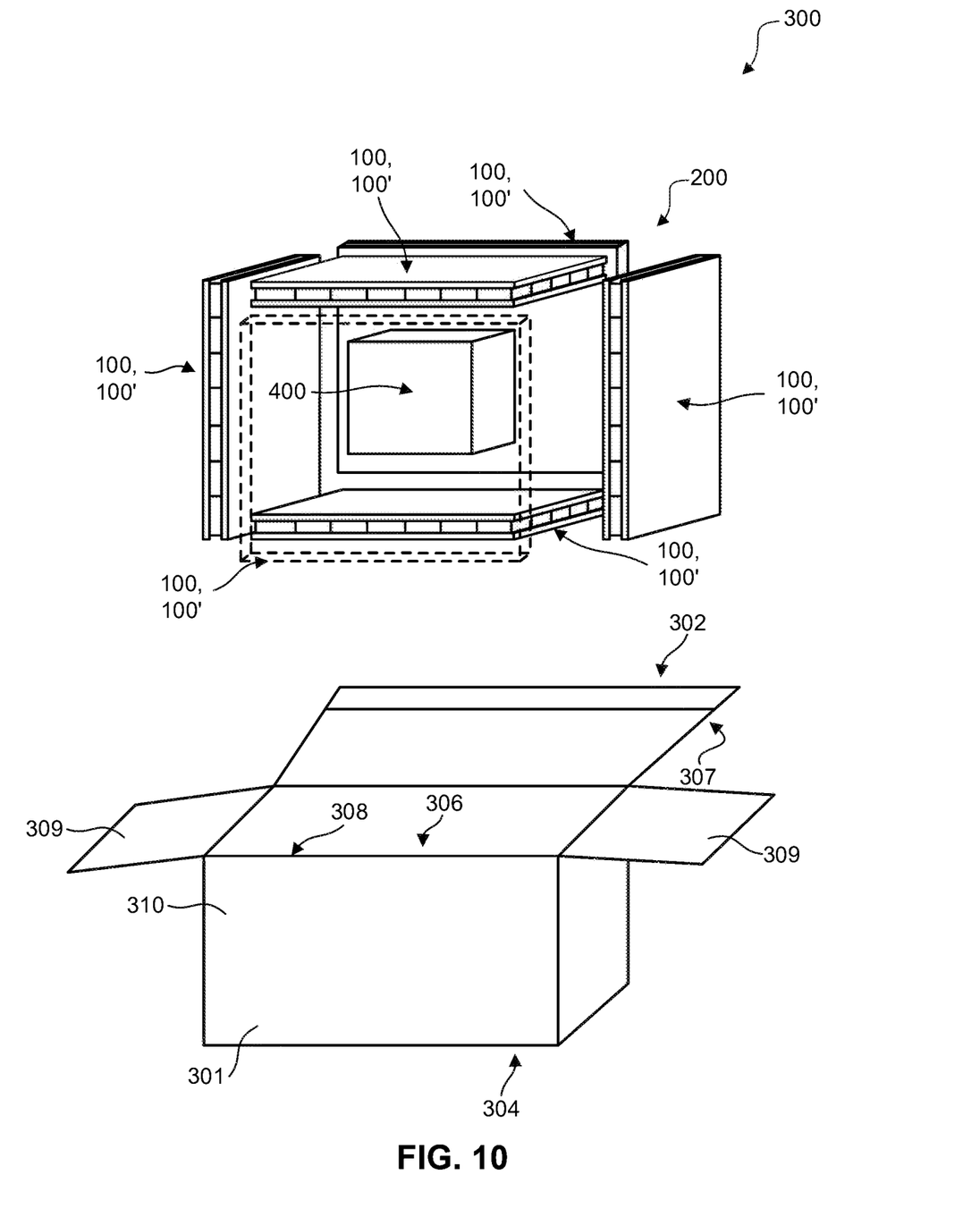
FIG. 10 illustrates a perspective exploded view of the insulating package of FIGS. 8 and 9.

FIGS. 8-10 illustrate insulating package 300, according to various exemplary embodiments. FIG. 8 is a schematic perspective view of insulating package 300, according to an exemplary embodiment. FIG. 9 is a schematic cross-sectional view of insulating package 300 shown in FIG. 8 (along the plane indicated by IX-IX in FIG. 8). FIG. 10 is a schematic perspective exploded view of insulating package 300 shown in FIGS. 8 and 9. Insulating package 300 can be configured to be completely biodegradable. Insulating package 300 can be further configured to provide thermal insulation (e.g., via one or more insulating panels 100, 100') to item 400 and reduce heat flow 500 to item 400. Although insulating package 300 is shown in FIGS. 8-10 as a stand-alone apparatus and/or system, the embodiments of this disclosure can be used with other apparatuses and/or systems, such as, but not limited to insulating panel 100, insulating panel 100', and/or other packaging engineering.

As shown in FIGS. 8-10, insulating package 300 can include container 301, one or more insulating panels 100, 100', and/or item 400. Container 301 can include frontside 302, backside 304, opening 306, top flap 307, interior surface 308, side flaps 309, and/or exterior surface 310. In some embodiments, insulating package 300 can be biodegradable. For example, insulating package 300 can be entirely (e.g., 100%) biodegradable. In some embodiments, container 301 can be biodegradable. For example, container 301 can be paper-based (e.g., cardboard, paperboard, containerboard, boxboard, packing paper, etc.).

In some embodiments, in a closed configuration, one or more insulating panels 100, 100' can be combined to form insulating cuboid 200 enclosing item 400. For example, as shown in FIGS. 9 and 10, insulating cuboid 200 can include six insulating panels 100, 100' forming a cuboid coupled to interior surface 308 of container 301. In some embodiments, one or more insulating panels 100, 100' can be combined to form an insulating package (e.g., similar to insulating package 300). For example, one or more insulating panels 100, 100' can be cut, partially cut, bent, and/or formed into an enclosed container (e.g., similar to cuboid 200 and container 301), for example, to enclose item 400. In some embodiments, one or more insulating panels 100, 100' can form container 301 and cuboid 200 can be omitted. For example, one or more insulating panels 100, 100' can be cut, partially cut, bent, and/or formed into an enclosed container (e.g., container 301), for example, to enclose item 400 such that a separate insulating layer (e.g., cuboid 200) is not necessary to insulate item 400. In some embodiments, insulating package 300 can be thermally insulating such that a temperature of item 400 disposed in insulating package 300 increases no greater than 0.24° C./min (e.g., during ASTM D3103 test). For example, when container 301 (e.g., 12.625 in.×12.625 in.×12.825 in.), interiorly lined with six insulating panels 100, 100' (e.g., insulating cuboid 200) surrounding item 400, is exposed to an environment maintained at 50° C., item 400 will increase 10° C. over a duration of 43 minutes (e.g., ASTM D3103 standard test method).

In some embodiments, insulating package 300 can have a comparable or greater thermal resistance capability than other insulated containers exposed to similar thermal environments (e.g., ASTM D3103 test conditions). For example, under ASTM D3103 test conditions, insulating package 300 is capable of providing equal or greater insulative properties as a cardboard carton of similar size (e.g., 12.625 in.×12.625 in.×12.825 in.) interiorly lined with a non-biodegradable foil-lined bubble wrap. In some embodiments, insulating package 300 can have a thermal insulance RSI-value of at least 3.0° C.·m²/W. For example, insulating package 300 with insulating cuboid 200 (e.g., six insulating panels 100) has a thermal insulance RSI-value of 3.08° C.·m²/W.

As shown in FIGS. 8 and 9, exterior heat flow 500 impinges insulating cuboid (e.g., six insulating panels 100, 100') and heats item 400 enclosed in container 301. An RSI-value (R-value in SI units) is a standard insulation metric in the packaging industry. The RSI-value is a measure of thermal insulance (e.g., thermal insulation capability) defined by the temperature difference (ΔT) per unit of heat flux (W/m²). Generally, the higher the RSI-value, the better the thermal insulation. For example, a closed-cell polyurethane spray foam (e.g., 1.0 in. thickness) has an RSI-value of 0.97° C.·m²/W and a polystyrene board (e.g., 1.0 in. thickness) has an RSI-value of 0.88° C.·m²/W. Note, reflective materials (e.g., foil-lined bubble wrap) have no inherent RSI-value.

In an exemplary embodiment, insulating package 300 underwent thermal testing based on the ASTM D3103 standard test. Container 301 (e.g., 12.625 in.×12.625 in.× 12.825 in.) was interiorly lined with six 0.5 in. thick insulating panels 100 (e.g., insulating cuboid 200). A 500 mL (500 g) H₂O test sample (e.g., item 400) was placed in the center of container 301 with a thermal sensor. Insulating panels 100 enclosed the 500 mL H₂O test sample to form insulating cuboid 200 and container 301 was closed and sealed shut. Insulating package 300 was placed in a uniform heating environment (e.g., a furnace) at a constant temperature of 50° C. The temperature of the 500 mL H₂O test sample increased 10° C. over a duration of 43 minutes.

Based on the definition of a calorie (1 cal=4.181 J), which is defined as the amount of heat (J) required to raise the temperature of 1 gram (1 mL) of H₂O by 1° C., the heat flow (e.g., heat flow 500) into insulating package 300 is given by:

Heat Flow (W) =

$$\frac{\Delta E}{\Delta t} = \frac{(4.184 \text{ J/(g·°C.)}) \cdot (500 \text{ g}) \cdot (10° \text{ C.})}{(2,580 \text{ s})} = \frac{(20,920 \text{ J})}{(2,580 \text{ s})} = 8.11 \text{ W}$$

Hence, the RSI-value (° C.·m²/W) of insulating package 300 is given by:

$$RSI\text{-value } (° \text{ C.·m}^2/\text{W}) =$$

$$\frac{\Delta T(\text{Outside} - \text{Inside})}{\text{Heat Flux } (\text{W/m}^2)} = \frac{(40° \text{ C.}) \cdot (0.625 \text{ m}^2)}{(8.11 \text{ W})} = 3.08° \text{ C.·m}^2/\text{W}$$

In use, interior surface 308 of container 301 can be lined with one or more insulating panels 100, 100' (e.g., insulating cuboid 200). Item 400 can then be placed inside opening 306 of container 301 within the one or more insulating panels 100, 100'. The one or more insulating panels 100, 100' can then enclose item 400 and form insulating cuboid 200. Container 301 can then be sealed (e.g., side flaps 309 and top flap 307) to form insulating package 300. In some embodiments, in use, one or more insulating panels 100, 100' can be combined to form an insulating package (e.g., similar to insulating package 300). For example, one or more insulating panels 100, 100' can be cut, partially cut, bent, and/or formed into an enclosed container (e.g., similar to cuboid 200 and container 301). Item 400 can then be placed inside the modified one or more insulating panels 100, 100'. The modified one or more insulating panels 100, 100' can then enclose item 400 and form an insulating package (e.g., similar to insulating package 300) made from the modified one or more insulating panels 100, 100'. In some embodiments, in use, one or more insulating panels 100, 100' can form container 301 and cuboid 200 can be omitted. For example, one or more insulating panels 100, 100' can be cut, partially cut, bent, and/or formed into an enclosed container (e.g., container 301). Item 400 can then be placed inside the modified one or more insulating panels 100, 100' (e.g., container 301). The modified one or more insulating panels 100, 100' can then enclose item 400 and form an insulating package (e.g., similar to insulating package 300) made from the modified one or more insulating panels 100, 100' such that a separate insulating layer (e.g., cuboid 200) is not necessary to insulate item 400.

It is to be appreciated that the Detailed Description section, and not the Brief Summary and Abstract sections, is intended to be used to interpret the claims. The Summary and Abstract sections may set forth one or more but not all exemplary embodiments of the insulating panels and packages as contemplated by the inventor, and thus, are not intended to limit the present embodiments and the appended claims in any way.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present disclosure. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present disclosure should not be limited by any of the above-described exemplary embodiments, but should be defined only in accordance with the following claims and their equivalents.

What is claimed is:

1. A biodegradable insulating panel for a package, comprising:
    a first layer of biodegradable material;
    a second layer of biodegradable material opposite the first layer;
    a moisture repellant layer disposed on exterior surfaces of the first and second layers;
    a biodegradable honeycomb core disposed between the first and second layers; and
    granulated corn pith disposed within cells of the honeycomb core to increase the resistance to heat flow of the panel,
    wherein the granulated corn pith has an average particle size no greater than about 2 mm.

2. The biodegradable insulating panel of claim 1, wherein the moisture repellant layer is a biodegradable wax.

3. The biodegradable insulating panel of claim 1, wherein the honeycomb core comprises:
    a first honeycomb core layer having a first plurality of cells; and
    a second honeycomb core layer having a second plurality of cells,
    wherein the cells of the first and second honeycomb core layers are displaced relative to each other.

4. The biodegradable insulating panel of claim 3, further comprising:
    a first air gap disposed within each of the first plurality of cells; and
    a second air gap disposed within each of the second plurality of cells.

5. The biodegradable insulating panel of claim 4, wherein a filled portion of each of the second plurality of cells is disposed over the first air gap of the first plurality of cells.

6. The biodegradable insulating panel of claim 1, wherein the entire insulating panel is biodegradable.

7. The biodegradable insulating panel of claim 1, wherein the biodegradable insulating panel provides thermal insulation to the contents of the package.

8. A biodegradable insulating panel for a package, comprising:
    a first biodegradable sheet;
    a second biodegradable sheet;
    a biodegradable honeycomb core having a plurality of cells, disposed between the first and second sheets; and
    granulated corn pith disposed within the cells,
    wherein the biodegradable insulating panel has a density no greater than about 300 kg/m$^3$.

9. The biodegradable insulating panel of claim 8, wherein the density of the panel is no greater than about 150 kg/m$^3$.

10. The biodegradable insulating panel of claim 8, wherein the granulated corn pith has an average particle size no greater than about 2 mm.

11. The biodegradable insulating panel of claim 8, wherein the entire insulating panel is biodegradable.

12. The biodegradable insulating panel of claim 8, wherein the biodegradable insulating panel provides thermal insulation to the contents of the package.

13. A biodegradable insulating package comprising:
    one or more biodegradable insulating panels including:
        a first biodegradable layer;
        a second biodegradable layer;
        a plurality of biodegradable honeycomb cells disposed between the first and second biodegradable layers; and
        granulated corn pith disposed in the plurality of biodegradable honeycomb cells,
    wherein the granulated corn pith has an average particle size no greater than about 2 mm.

14. The biodegradable insulating package of claim 13, wherein the biodegradable insulating panel forms a cuboid.

15. The biodegradable insulating package of claim 13, wherein the biodegradable insulating panel further includes a moisture repellant layer disposed on exterior surfaces of the first and/or second biodegradable layers.

16. The biodegradable insulating package of claim 15, wherein the moisture repellant layer is a biodegradable wax.

17. The biodegradable insulating package of claim 13, wherein the entire insulating package is biodegradable.

18. The biodegradable insulating package of claim 13, wherein the biodegradable insulating panel has a density no greater than about 300 kg/m$^3$.

19. The biodegradable insulating package of claim 13, wherein the biodegradable insulating package has a thermal insulance RSI-value of at least 3.0° C.·m$^2$/W, wherein the biodegradable insulating panel has a thickness of 1.27 cm.

20. The biodegradable insulating package of claim 13, wherein the biodegradable insulating package is thermally insulating such that a temperature of an item disposed in the biodegradable insulating package increases no greater than 0.24° C./min under ASTM D3103 standard test conditions.

* * * * *